Dec. 15, 1942.     R. C. GILBERT     2,305,154
LIQUID LEVEL CONTROL DEVICE
Filed Dec. 14, 1940

INVENTOR
RUSSELL C. GILBERT
BY Williams, Bradbury & Hinkle
ATTORNEYS

Patented Dec. 15, 1942

2,305,154

UNITED STATES PATENT OFFICE 2,305,154

LIQUID LEVEL CONTROL DEVICE

Russell C. Gilbert, South Bend, Ind., assignor to Bendix Home Appliances, Inc., South Bend, Ind., a corporation of Delaware Application December 14, 1940, Serial No. 370,122

8 Claims. (Cl. 137—68)

This invention relates to liquid level control devices and more particularly to devices, responsive to pressures created by variations in liquid level, for carrying out various control functions.

One of the objects of the invention is to provide a device, sensitive to liquid pressures due to variations in level, in which liquid is prevented from coming in contact with the sensitive element of the device. According to one desirable construction, the sensitive element of the device, which may be a diaphragm or a manometer tube, is separated from the liquid by a trapped air column.

Another object of the invention is to provide a device including an element movable in response to pressures created by variations in liquid level and which operates a control member such as an electric switch. According to one important feature of the invention, a plurality of such control members is provided, these control members being successively operated by the movable element as it moved in response to increasing pressures.

Still another object of the invention is to provide a cleaning machine or the like in which the inlet of cleaning liquid is controlled by a pressure device which is responsive to liquid level in such a way that the cleaning liquid is shut off when the liquid reaches a predetermined high level and is kept shut off until the liquid reaches a predetermined low level.

Other objects, advantages and novel features of the invention will be apparent from the following description, when read in connection with the accompanying drawing, in which.

Figure 1:
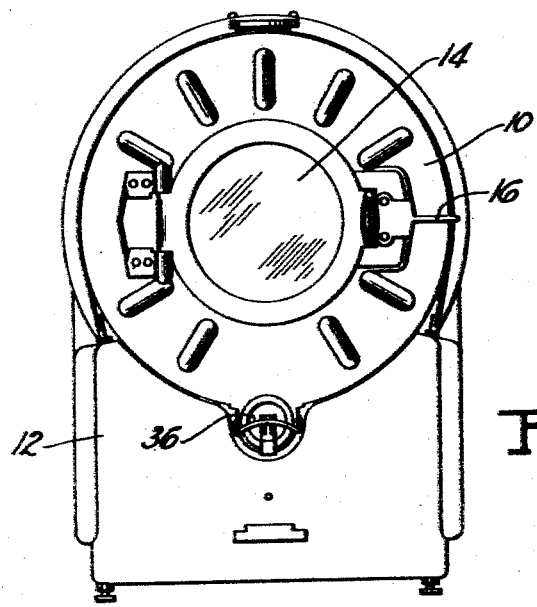
Figure 1 is an elevation of a washing machine, with which the invention may be used.

The washing machine illustrated in Figure 1 is of the type more particularly described and claimed in Patent No. 2,165,884, issued to Bassett and Chamberlin, and it includes a tub 10 mounted with its axis horizontal on a base 12. A door 14 is hingedly mounted in one end of the tub 10 for the introduction of materials to be cleaned, and a perforated drum or container is arranged in the tub 10 to receive such material. The drum is adapted to be driven by the motor and transmission mechanism arranged in the base 12 and controlled automatically as described in said Patent No. 2,165,884.

During operation of the machine, water is supplied from a city main or other desired source and flows into the tub adjacent the door 14 through a tube indicated at 16. Preferably both hot and cold water are supplied under the control valves indicated generally at 18 in Figure 2.

It is desired that when the water reaches a predetermined level in the tub the valves 18 should be closed to prevent the further admission of water, so as to limit the level within the tub to the desired height. In order to control the valves, solenoids 20 are provided associated with the valves to open the same, the valves normally closing under the influence of gravity or springs, not shown, when the solenoids are de-energized. The solenoids are connected in circuit with a source of current indicated at 22 and are controlled by a switch including a blade 24, which is adapted to be contacted by a blade 26.

According to the present invention, the switch 24—26 is controlled in response to the liquid level in the tub 10 through a control circuit including a blade 28 insulated from but secured to the blade 26 and adapted to engage a contact 30. The double blade 26—28 normally engages the contact 24 but is adapted to be moved away from the contact 24 into engagement with the contact 30 by a solenoid 32.

The solenoid 32 is controlled by a device, sensitive to the weight of the column of liquid in the tub, which is arranged at the lower portion of the tub so as to be responsive to the pressure created by variations of the liquid level in the tub. As shown, the tub is provided at its lower portion with a cylindrical casing 34 adapted to receive a drain screen indicated at 36 in Figure 1, and which communicates freely with the lower portion of the tub. In one end of the casing 34, preferably the rearmost end, there is provided a plug 38, which may be formed of a non-conducting plastic material or which may, if desired, be formed of metal closed by a non-conducting plate 40. A pair of overlapping baffles 42 is carried by the plug 38 in such a way as to form an upwardly extending passage 44 communicating at its lower end with the lower part of the tub through the casing 34. The upper end of the passage 44 communicates with one side of a flexible diaphragm 46, which is yieldingly held in substantially the position shown in Figure 2 by its own resiliency or by a spring, not shown, and which is adapted to be urged to the right by pressure developed in the passage 44.

Due to the arrangement of the baffles 42, it will be noted that direct access of the liquid to the diaphragm 46 is prevented. As the liquid rises in the tub, it will also tend to rise in the passage 44, compressing air ahead of it and creating an air pressure on the diaphragm. The vertical height of the passage 44 is so selected that liquid will never rise over the top of the inner baffle 42 in normal operation of the machine, so that the diaphragm will be exposed only to air pressure and will not be contacted by the cleaning liquid, which might tend to foul it.

The plate 40 carries a fixed contact 48, which is adapted to be engaged by a flexible contact 50, which, in turn, may be engaged by a second flexible contact 52. The central portion of the diaphragm, as it moves in response to pressure, will first press the contact 52 into engagement with the contact 50 to close a circuit therebetween, and as the pressure increases further, it will press the contact 50 into engagement with the fixed contact 48. Preferably, the contact 50 is engageable by an adjusting screw 54, which may be adjusted to vary the pressure required to move the contact 50 into engagement with the contact 48.

The fixed contact 48 is connected by a wire 56 with one side of the solenoid 32 and with the contact 30, the opposite side of the solenoid 32 being connected to a power line 58. The contact 50 is connected by a wire 60 with the switch blade 28, and the contact 52 is connected by a wire 62 with the other side of the power source.

Figure 2:
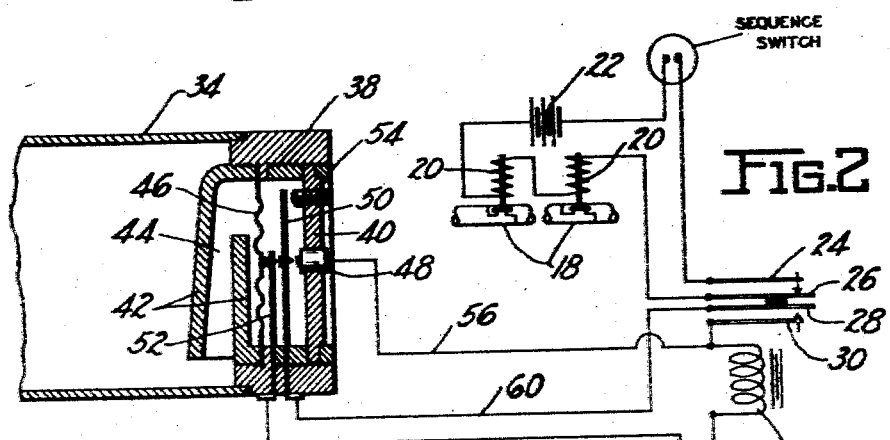
Figure 2 is a diagrammatic view, with parts shown in section, illustrating one application of the invention to the washing machine of Figure 1.

The parts are shown in Figure 2 in the position they will occupy when the main control switch, not shown, is closed and there is no cleaning liquid in the tub. At this time, the solenoid 32 is de-energized and the switch blade 26 is in contact with the switch blade 24 to close a circuit through the solenoids 20, so that the valves 18 will be opened. As water flows into the tub 10 past the valves 18, pressure acting on the diaphragm 46 will move it to the right, first engaging the contacts 50 and 52. Since the switch blade 28 is out of contact with the blade 30, engagement of the contacts 50 and 52 will have no effect and the valves 18 will remain open. As the water level rises further, the increased pressure on the diaphragm 46 will urge it further to the right, until, at a predetermined water level, the contact 50 engages the contact 48. This closes a circuit through the solenoid 32 from line 58 through the solenoid, through line 56 to contact 48, through contact 50 to contact 52 and line 62 to the other side of the power source.

At this time, the double blade 26—28 will be moved down by the solenoid 32 to interrupt the circuit at 24—26 and to engage the blade 28 with the contact 30. This will de-energize the solenoids 20, allowing the valves 18 to close, interrupting the admission of water to the tub. The usual washing cycle of the machine as described in said Patent No. 2,165,884 may now be carried out, until the drain valve, not shown, is opened to withdraw the water from the machine. As the water level decreases, pressure on the diaphragm 46 will decrease, allowing it to move to the left, first interrupting the circuit between contacts 48 and 50. The solenoid 32 will remain energized however, due to the maintenance of a holding circuit from the power line 58 through the solenoid contacts 30 and 28 and wire 60 to contact 50 and to contact 52 and wire 62 to the other side of the power circuit. This holding circuit will be maintained until the water level falls to a predetermined lower level, at which contact 52 will move out of engagement with the contact 50. When this occurs, the solenoid 32 will be de-energized and the double blade 26—28 will move up out of engagement with the contact 30 and into engagement with the contact 24 to re-energize the solenoids 20 and open the valves 18.

Figures 3, 4:
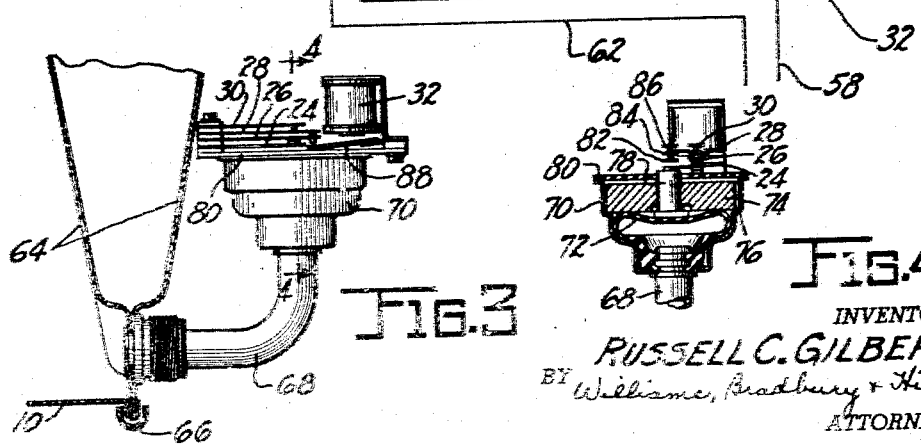
Figure 3 is a side view, with parts in section, of another construction.
Figure 4 is a section on the line 4—4 of Figure 3.

Figures 3 and 4 illustrate an alternative construction, and as shown in these figures the rear end of the tub 10 is closed by a pair of dished plates 64 secured to the tub by a clamp ring 66. This construction is more particularly described and claimed in Patent No. 2,173,603, issued to Dodge.

A pipe 68 opens through the plates 64 at the lower part of the tub and curves upwardly to terminate in a housing 70. Within the housing, as best seen in Figure 4, there is arranged a flexible diaphragm or capsule 72 of rubber or the like connected to the upper end of the conduit 68. An annular weighted disk 74 is slidably mounted in the housing and fits over the top of the capsule 72, downward movement of the disk 74 being prevented by a shoulder portion 76 in the housing. A plunger 78, also resting on the upper part of the diaphragm 72, is slidably mounted within the disk 74.

The top of the housing 70 is closed by a plate 80 on which flexible contact blades 24', 26', 28' and 30' are supported. These blades correspond to the similarly numbered blades in Figure 2. Also supported on the plate 80 are three contact blades including a lower blade 82, an intermediate blade 84 and an upper blade 86. The lower blade 82 corresponds to the blade 52 of Figure 2; the middle blade 84 corresponds to the blade 50 of Figure 2; and the upper blade 86 corresponds to the contact 48 of Figure 2. It will be understood that these blades are connected in circuit with the blades 24', 26', 28' and 30' and with the solenoid 32' in the same manner as in Figure 2.

The upper end of the plunger 78 carries an insulating button adapted to engage the lower blade 82 to control the circuits as the plunger is moved upwardly. A pivotally mounted armature 88, controlled by the solenoid 32', is adapted to engage the double blade 26'—28' to move it upwardly, as best seen in Figure 3. This operation interrupts the normal engagement between blades 24' and 26' and moves blade 28' into engagement with blade 30' in the same manner as in Figure 2.

The parts are shown in Figure 4 in the position that they will occupy when the tub is empty, with the diaphragm 72 collapsed, the disk 74 moved down against shoulder 76 and the plunger 78 moved down out of engagement with the contact 82. As the water level increases in the tub, it will tend to rise in the pipe 68 and will trap air in the pipe. The air pressure acting on the diaphragm 72 will expand it, forcing the plunger 78 upwardly until it moves the contact 82 into engagement with the contact 84. At this time, the plunger will engage the disk 74 and its further upward movement will be stopped. As the water level rises further, the pressure in the diaphragm 72 will increase until it is sufficient to raise the disk 74 from the shoulder 76. At this time, plunger 78, rising with the plate, will move contacts 82 and 84 upwardly until contact 84 engages contact 86. It will be apparent that the pressure at which this action will occur can be regulated by varying the weight of the disk 74.

When the contacts 84 and 86 are in engagement, the solenoid 32' will be energized to lift the armature 88 and the double blade 26'—28'. At this time, the valve solenoids 20 will be de-energized to close the valves 18 and the holding circuit will be established by engagement of contacts 28' and 30'.

Upon a decrease in water level, the operation will be reversed, the lowered pressure in the diaphragm 72 permitting the disk 74 and the plunger 78 to fall.

While two embodiments of the invention have been shown and described in detail, it will be understood that these are illustrative only and are not intended as a definition of the scope of the invention, reference being had for this purpose to the appended claims.

What is claimed is:

1. A liquid level responsive device comprising means forming an upwardly extending passage communicating at its lower end with liquid to be measured and sealed therefrom at its upper end, means communicating with the upper end of said passage and movable in response to the pressure in the passage, and two control circuits individually operated one by the first movement and the other by further movement of the last-named means as the pressure on said means decreases.

2. A liquid level responsive device comprising means forming an upwardly extending passage communicating at its lower end with liquid to be measured and sealed therefrom at its upper end, means communicating with the upper end of said passage and movable in response to the pressure in the passage, and a plurality of switches successively opened by said last-named means as it moves in response to a decreasing liquid level.

3. A liquid level responsive device comprising means forming an upwardly extending passage communicating at its lower end with liquid to be measured and sealed therefrom at its upper end, a flexible diaphragm communicating on one side with the upper end of said passage, and a plurality of flexible contact members in the path of the diaphragm to be successively moved by the diaphragm as it is flexed a source of current, a relay having its coil circuit closed with said source through certain of said contact members, and having a locking circuit closed through other of said contact members.

4. A liquid level responsive device comprising a casing, a horizontal diaphragm in the casing, a pressure connection from below the diaphragm to the liquid to be measured, a weight disk mounted above the diaphragm in position to be lifted by the upward movement of the diaphragm, a plunger extending through the disk and guided thereby and engaging the diaphragm and a plurality of flexible contact members in the path of the plunger to be successively moved thereby as the diaphragm is flexed, a source of current, an electro-magnet having its circuit closed with said source through certain of said contact members, and having a locking circuit closed through other of said contact members.

5. A liquid level responsive device comprising a casing, a horizontal diaphragm in the casing, a pressure connection from below the diaphragm to the liquid to be measured, a weight disk mounted above the diaphragm in position to be lifted by the upward movement of the diaphragm, a plunger extending through the disk and guided thereby and engaging the diaphragm, and control means aligned with and operated by the plunger as it is moved by the diaphragm.

6. A liquid level responsive device comprising a casing, a horizontal diaphragm in the casing, a pressure connection from below the diaphragm to the liquid to be measured, a disk slidably mounted in the casing above the diaphragm, interengaging means on the casing and disk to limit downward movement of the disk, a plunger slidably extending through the disk and adapted to engage the diaphragm, and control means successively operated by the plunger as it is moved through the disk and as the disk is moved in response to increased pressure.

7. In a washing machine having a tub to contain cleaning liquid and an inlet for cleaning liquid, a control system comprising baffle means at the bottom of the tub forming an upwardly extending passage opening at its lower end into the lower part of the tub, means connected to the upper end of said passage and movable in response to the pressure in the passage caused by liquid in the tub, and control means for the cleaning liquid inlet including a control device operated by said last-named means.

8. In a washing machine having a tub to contain cleaning liquid and an inlet for cleaning liquid, a control system comprising baffle means at the bottom of the tub forming an upwardly extending passage opening at its lower end into the lower part of the tub, means connected to the upper end of said passage and movable in response to the pressure in the passage caused by liquid in the tub, a pair of switches controlled by said last-named means, and control means for the cleaning liquid inlet controlled by said switches to close the liquid inlet when the liquid reaches a predetermined upper level and to hold the inlet closed until the liquid falls below a predetermined lower level.

RUSSELL C. GILBERT.